United States Patent [19]

MacMillan et al.

[11] Patent Number: 5,858,947

[45] Date of Patent: Jan. 12, 1999

[54] METAL CLEANING AND DE-ICING COMPOSITIONS

[75] Inventors: John A. MacMillan, Wirral; Mark L. Brewer, Chester; Andrew C. Duncan, Wirral, all of Great Britain

[73] Assignee: The Associated Octel Company Limited, London, England

[21] Appl. No.: 836,515

[22] PCT Filed: Nov. 9, 1995

[86] PCT No.: PCT/GB95/02631

§ 371 Date: Aug. 27, 1997

§ 102(e) Date: Aug. 27, 1997

[87] PCT Pub. No.: WO96/15293

PCT Pub. Date: May 23, 1996

[30] Foreign Application Priority Data

Nov. 11, 1994 [GB] United Kingdom .................. 9442761

[51] Int. Cl.$^6$ .................. C23G 1/24; C09K 3/18
[52] U.S. Cl. .................. 510/245; 106/13; 106/14.13; 106/14.18; 106/14.42; 106/14.44; 252/70; 134/3; 134/41; 510/254; 510/255; 510/258; 510/264
[58] Field of Search .................. 252/70; 510/245, 510/254, 255, 258, 264; 106/13, 14.13, 14.18, 14.42, 14.44; 134/2, 3, 41

[56] References Cited

U.S. PATENT DOCUMENTS 3,158,635  11/1964  Kezerian et al. .................. 562/565
4,704,233  11/1987  Hartman et al. .................. 510/337

FOREIGN PATENT DOCUMENTS 386886       9/1990   European Pat. Off. .
2288607     10/1995   United Kingdom .
WO 95/12570  5/1995   WIPO .

OTHER PUBLICATIONS

JAPIO Patent Abstract No. JP409049084A which is an abstract of Japanese Patent Abstact No. 9–049084 (Feb. 1997.)

*Primary Examiner*—Anthony Green
*Attorney, Agent, or Firm*—Fay, Sharpe, Beall, Fagan, Minnich & McKee

[57] ABSTRACT

A metal cleaning composition comprising EDDS is described. Preferably, the compositions comprise optical isomers of EDDS, such as (s,s)EDDS. The compositions are particularly well suited for cleaning iron, zinc, aluminum, and copper. De-icer compositions comprising EDDS are also described. Also disclosed are processes for using the compositions.

18 Claims, 8 Drawing Sheets

METAL CLEANING AND DE-ICING COMPOSITIONS

BACKGROUND OF THE INVENTION

1. Field of the Invention

The present invention relates to the use of a compound. In particular, the present invention relates to the use of ethylene diaminedisuccinic acid "EDDS".

2. Description of Related Art

In some applications it is desirable to clean metal surfaces, such as in the automotive and aeronautical industries, and in applications such as metal machining and forming, as well as in the preparation of circuit boards and integrated circuits.

Many of the metal cleaning compositions used contain, as their active agents, acids. However, whilst the acids may remove the external layers of dirt, grease, unwanted paint and the like, they can remove some or all of the protective metal oxide layers and, in doing so, make the cleaned metal more prone to corrosion. This is very undesirable.

There is therefore a need to have a metal cleaner that is non-corrosive, i.e. will not remove the metal's protective oxide layer (see for example Business Communications Company Inc. Report C.173 page 20, June 1993).

Generally, the corrosiveness of a solution can be measured in terms of anodic breakdown potential (mV) of the metal oxide layer. The higher the anodic breakdown potential (ABDP), the less the metal will corrode during and after treatment with the metal cleaner.

Ideally, metal cleaners should have ABDP values of at least 200 mV. Preferably, for the cleaning of aluminum it is desirable that the metal cleaners should have ABDP values of at least 400 mV.

Two of the commonly used metal cleaners are ethylene diamine tetra-acetic acid (EDTA) and gluconic acid (GA). However, there are problems associated with these metal cleaners. In this regard, under certain conditions EDTA has an ABDP value of 0 mV for aluminum and copper, two metals which are often in need of cleaning; whereas gluconic acid has an ABDP value of 0 mV for zinc, copper and aluminum.

Further ABDP values for these two metal cleaners are presented later in Tables 1–3.

There is therefore a need for metal cleaners that are not corrosive, i.e. have a low-corrosive effect on the metals.

The present invention seeks to overcome the problems associated with the prior art metal cleaners.

SUMMARY OF THE INVENTION

According to a first aspect of the present invention there is provided a metal cleaning composition comprising as its active agent at least EDDS.

According to a second aspect of the present invention there is provided a process of cleaning metal wherein the metal is cleaned with the composition as defined above.

According to a third aspect of the present invention there is provided the use of EDDS as a low-corrosive cleaning agent in a metal cleaning composition.

DESCRIPTION OF THE PREFERRED EMBODIMENTS

Figure 1:
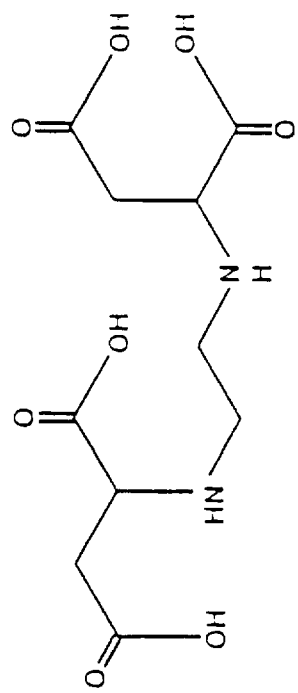
FIG. 1 discloses EDDS.
Figure 2:
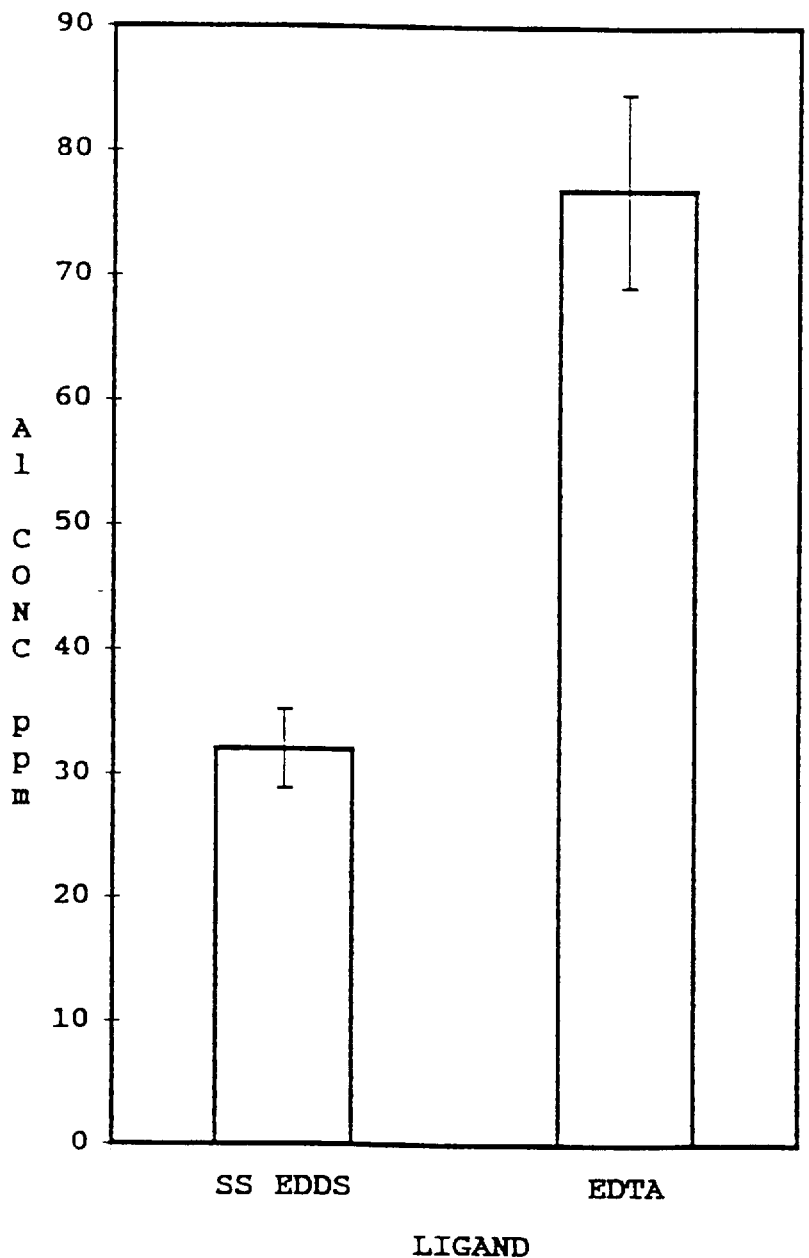
FIG. 2 illustrates the concentration of Al (III) in 5% ligand solution, after exposure to aluminum foil for 24 hours at pH 7 and 25° C.
Figure 3:
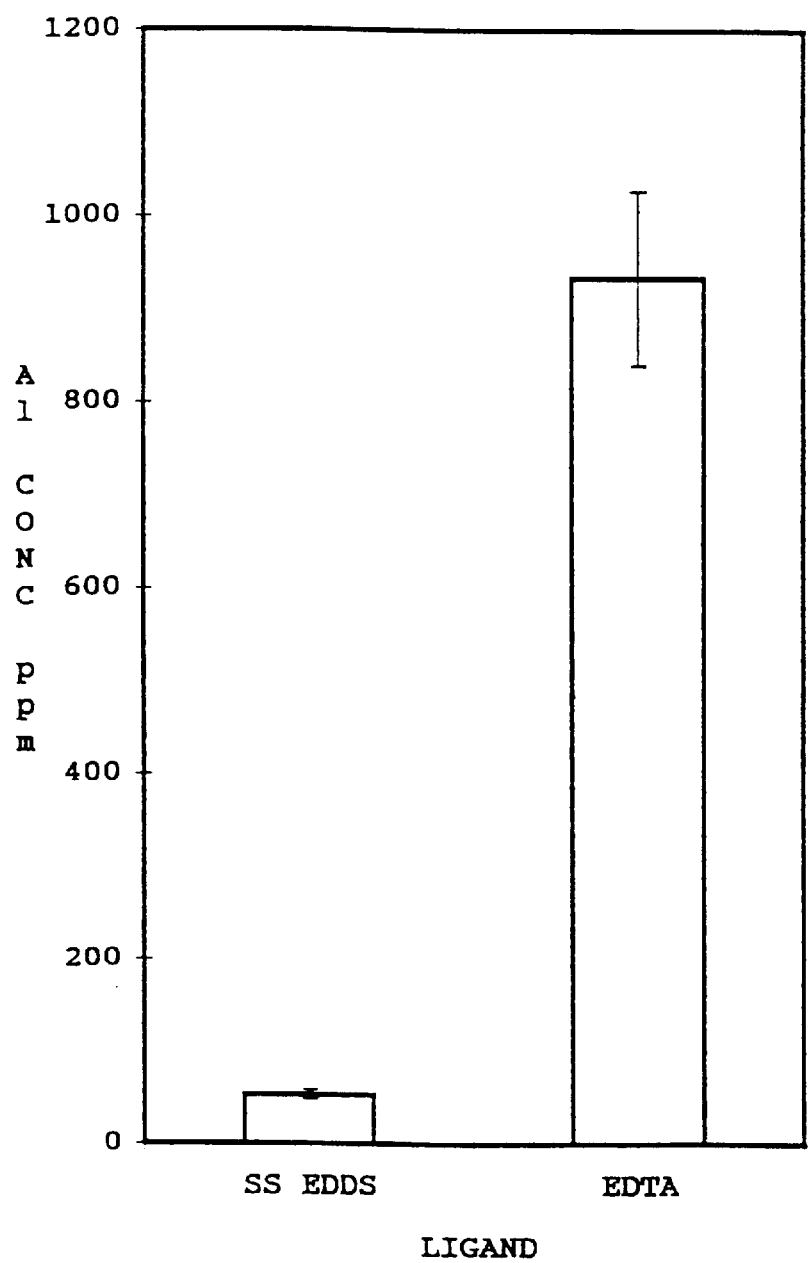
FIG. 3 illustrates the concentration of Al (III) in 5% ligand solution, after exposure to aluminum foil for 24 hours at pH 10 and 25° C.

The term "EDDS" includes racemic EDDS as well as optical isomers thereof, such as (s,s)EDDS, and active salts and active derivatives thereof. Preferably the term means (s,s)EDDS or salts thereof. Preferably the EDDS is (s,s) EDDS. More preferably the EDDS is (s,s)EDDS as prepared by the process of PCT/GB94/02397 filed 2 Nov. 1994.

Most preferably the metal to be cleaned is iron, zinc, aluminum or copper, preferably aluminum.

The term "active" means the ability to have an ABDP value of at least 200 mV at a pH of about 3–14, preferably 5–12, for aluminum, iron, copper and zinc.

The term "at least EDDS" means that other cleaning agents or acids may be present.

However, for some applications, preferably the acid is EDDS alone.

The term "metal" includes any suitable metal for cleaning. For example, the metal can be iron, zinc, copper or aluminum. The metal can even be pre or post formed into a substrate, such as a circuit board. Preferably the term "metal" means aluminum.

In more detail, the present invention is based on the surprising discovery that EDDS can be used as a low-corrosion metal cleaner. More in particular, the present invention is based on the surprising discovery that EDDS has an ABDP value of at least 200 mV for iron, aluminum, copper and zinc. This is an important advantage.

The presence of EDDS in a metal cleaning composition is advantageous because its use does not lead to the corrosion of the metal, such as stripping away substantial amounts of the protective metal oxide outer coatings. This is particularly advantageous with aluminum.

The use of EDDS in or as a metal cleaning composition is advantageous because it has a greater cleaning effect than, for example, EDTA and gluconic acid.

Our studies with EDDS, some of which are reported in the following experimental section, showed that EDDS is an effective metal cleaner. The results also indicate that EDDS is also effective if mixed metal ions are present. Another important advantage is that EDDS does not destroy aluminum surfaces. In this regard, EDDS selectively removes deposits of unwanted metal ions such as for example copper ions and iron ions, which are generally deposited on the aluminum surface, in the forms of their oxides without removing the aluminum. This is particularly advantageous. This effect of EDDS is in complete contrast to the effects of chelates such as EDTA.

Accordingly the present invention also provides the use of EDDS to clean aluminum surfaces by removing unwanted other metal deposits thereon without substantially destroying the aluminum surface.

One important application of this aspect is in the metal forming industries, such as the use of aluminum or other metals to make supports, fittings and other parts for aeronautical and automotive applications. The use of EDDS in these applications is advantageous as it enables one to effectively clean the surfaces of the met al before, during or after the forming process. Thus the EDDS will prevent or reduce or remove the build up of unwanted metal deposits.

In addition, the use of EDDS is also useful as a metal cleaner when incorporated in solutions that are used for other applications in the aeronautical and auto motive industries, such as their use in de-icer compositions.

Typically, the EDDS will be present in an de-icer composition in an amount of from about 0.1% to about 10%, preferably from about 1% to about 10%, more preferably from about 2% to about 7%, typically about 5% (wherein % is the w/w % of the final composition).

Typical de-icer composition comprise organic chelating agents, such polyphosphates, aminocarboxylic acids, 1,3-diketones, hydroxycarboxylic acids, polyamines, amino alcohols, aromatic heterocyclic bases, phenols, aminophenols, oximes, Schiff bases, tetrapyrroles, sulphur compounds, synthetic macrocycles, polymeric chelates and phosphonic acids. For example, the de-icer composition of EP-A-0386886 comprises an organic chelating agent and an alkaline earth and/or an alkali metal carboxylate. The preferred alkaline earth carboxylate is calcium magnesium acetate (CMA). The preferred alkali metal carboxylate is sodium formate. The preferred chelating agents of EP-A-0386886 are said to be aminocarboxylic acids containing 2 to 4 carboxylic acid groups. The chelating agents listed in EP-A-0386886 are ethylenediaminetetraacetic acid, hydroxyethylethylenediaminetriacetic acid (HEDTA), nitrilotriacetic acid (NTA), N-dihydroxyethylglycine (2-HXG), and ethylenebis(hydroxyphenylglycine) (EHPG). The most preferred chelating agent of EP-A-0386886 is EDTA in its partially neutralized form as a calcium salt.

With the present invention a de-icer composition comprises as the organic chelating agent at least EDDS. In this regard, the de-icer composition can comprise chelating agents other than EDDS. However, it is preferred that the chelate is just EDDS. When the de-icer compositions of the present invention are used they do not destroy metal surfaces that come into contact with the de-icer composition. This is very advantageous.

The present invention will now be described only by way of example, in which reference shall be made to FIG. 1 which shows the formula of EDDS. Reference is also made to FIGS. 2–8 which are plots of soluble metal ion concentrations after addition of chelates to substrates.

EDDS

The structure of EDDS is shown in FIG. 1.

PREPARATION OF EDDS

A preferred method for making EDDS is disclosed in co-pending PCT Patent Application No. PCT/GB94/02397 filed 2 Nov. 1994, herein incorporated by reference.

In short, PCT/GB94/02397 discloses a process for the preparation of amino acid derivatives in free acid or salt form, herein referred to as an amino acid linking reaction in which the nitrogen atoms of two or more amino acid molecules are linked by a hydrocarbonyl or substituted hydrocarbonyl group, which comprises reacting, in an aqueous medium at a pH in the range 7–14, a compound of the formula X-A-Y where X and Y are halo atoms which may be the same or different and A is a hydrocarbonyl or substituted hydrocarbonyl group, in which X and Y are attached to aliphatic or cycloaliphatic carbon atoms, with an amino acid (or salt thereof), wherein the reaction is carried out in the presence of dissolved cations of an alkaline earth metal or of a transition metal.

For example, (s,s)EDDS may be prepared according to the following teachings, in which DBE means 1,2-dibromoethane.

A reaction mixture containing 150.1 g L-aspartic acid, 140.0 g of 50% aq. NaOH, and 210.9 g water at a pH of 10.2 at 25° C. together with 57.8 g of DBE was heated at 85° C. for 4 hours. During this time an additional 50.1 g of 50% aq. NaOH was added to maintain the pH. At the end of the reaction period the solution was heated to boiling point for 1 hour then cooled to room temperature and 1633 g of water added. The solution was acidified with 36% HCl to pH 3 maintaining the temperature below 50° C. The solid product was collected by filtration. The solid product was (s,s)EDDS (51.5 g on 100% basis), representing a yield on L-aspartic acid charged of 31.3%, no other isomers being detected in the product. In the mother liquors was 85.7 g unreacted L-aspartic acid. The conversion of L-aspartic acid was 42.9% and selectivity to (s,s)EDDS was 72.8%.

ELECTROCHEMICAL CORROSION TESTS

The electrochemical corrosive properties of (s,s)EDDS, EDTA and gluconic acid were tested by dissolving an appropriate amount of chelate in a standard 3.5 ww % NaCl solution. The solutions were analyzed by use of AC impedance techniques.

The results are shown in the following Tables 1–3.

TABLE 1

| | PURE ALUMINUM | | CARBON STEEL | |
|---|---|---|---|---|
| | C.R. (mm/v) | ABDP (mV) | C.R. (mm/v) | ABDP (mV) |
| (s,s)EDDS | | | | |
| 3.5% NaCl + 500 ppm EDDS pH 5.1 | 4.02E-03 | none | 6.25E-02 | none |
| 3.5% NaCl + 500 ppm EDDS pH 7.0 | 3.12E-02 | 615 | 9.15E-02 | 73 |
| 3.5% NaCl + 500 ppm EDDS pH 9.1 | 4.69E-02 | 660 | 8.93E-02 | none |
| 3.5% NaCl + 500 ppm EDDS pH 10.5 | 4.69E-02 | 623 | 8.70E-02 | none |
| EDTA | | | | |
| 3.5% NaCl + 500 ppm EDTA pH 3.97 | 5.80E-02 | none | 7.36E-02 | none |
| 3.5% NaCl + 500 ppm EDTA pH 4.86 | 3.35E-02 | none | 4.47E-02 | none |
| 3.5% NaCL + 500 ppm EDTA pH 6.88 | 7.14E-02 | 550 | 1.21E-01 | none |
| 3.5% NaCl + 500 ppm EDTA pH 9.42 | 8.48E-02 | 370 | 4.24E-02 | none |
| 3.5% NaCl + 500 ppm EDTA pH 10.6 | 1.42E-01 | 600 | 8.93E-02 | none |
| GLUCONIC ACID | | | | |
| 3.5% NaCl + 500 ppm GA pH 6.40 | 2.45E-02 | none | 1.14E-01 | none |
| 3.5% NaCl + 500 ppm GA pH 8.45 | 3.35E-02 | none | 4.46E-02 | none |
| 3.5% NaCl + 500 ppm GA pH 9.42 | 1.02E-02 | none | 1.19E-01 | none |

TABLE 2

|  | MONEL 400 | | STAINLESS STEEL 316 | |
| --- | --- | --- | --- | --- |
|  | C.R. (mm/v) | ABDP (mV) | C.R. (mm/v) | ABDP (mV) |
| (s,s)EDDS | | | | |
| 3.5% NaCl + 500 ppm EDDS pH 5.1 | 6.26E-02 | none | 2.25E-03 | 270 |
| 3.5% NaCl + 500 ppm EDDS pH 7.0 | 5.41E-03 | 155 | 4.51E-04 | 275 |
| 3.5% NaCl + 500 ppm EDDS pH 9.1 | 3.98E-04 | 100 | 7.99E-05 | 400 |
| 3.5% NaCl + 500 ppm EDDS pH 10.5 | 6.26E-04 | 140 | 7.58E-05 | 530 |
| EDTA | | | | |
| 3.5% NaCl + 500 ppm EDTA pH 3.97 | 1.25E-01 | none | 1.43E-03 | 170 |
| 3.5% NaCl + 500 ppm EDTA pH 4.86 | 7.40E-02 | none | 1.82E-03 | 200 |
| 3.5% NaCL + 500 ppm EDTA pH 6.88 | 3.13E-02 | 115 | 2.66E-03 | 350 |
| 3.5% NaCl + 500 ppm EDTA pH 9.42 | 1.31E-03 | 110 | 1.52E-04 | 260 |
| 3.5% NaCl + 500 ppm EDTA pH 10.6 | 3.41E-02 | 150 | 9.22E-05 | 450 |
| GLUCONIC ACID | | | | |
| 3.5% NaCl + 500 ppm GA pH 6.40 | 5.12E-03 | 180 | 6.35E-04 | 165 |
| 3.5% NaCl + 500 ppm GA pH 8.45 | 3.70E-03 | 110 | 1.25E-03 | 380 |
| 3.5% NaCl + 500 ppm GA pH 9.42 | 2.05E-03 | none | 2.05E-04 | 260 |

TABLE 3

|  | COPPER | | ZINC ALLOY 5 | |
| --- | --- | --- | --- | --- |
|  | C.R. (mm/v) | ABDP (mV) | C.R. (mm/v) | ABDP (mV) |
| (s,s)EDDS | | | | |
| 3.5% NaCl + 500 ppm EDDS pH 5.1 | 7.19E-02 | none | 2.69E-01 | none |
| 3.5% NaCl + 500 ppm EDDS pH 7.0 | 3.82E-02 | 90 | 3.47E-01 | none |
| 3.5% NaCl + 500 ppm EDDS pH 9.1 | 9.66E-02 | none | 2.02E-01 | none |
| 3.5% NaCl + 500 ppm EDDS pH 10.5 | 1.53E-01 | 160 | 3.18E-01 | 180 |
| EDTA | | | | |
| 3.5% NaCl + 500 ppm EDTA pH 3.97 | 6.96E-02 | none | 1.04E-01 | none |
| 3.5% NaCl + 500 ppm EDTA pH 4.86 | 1.68E-01 | none | 1.85E-01 | none |
| 3.5% NaCL + 500 ppm EDTA pH 6.88 | 1.19E-01 | none | 1.47E-01 | 100 |
| 3.5% NaCl + 500 ppm EDTA pH 9.42 | 2.47E-01 | 100 | 2.28E-01 | none |
| 3.5% NaCl + 500 ppm EDTA pH 10.6 | 2.04E-01 | 90 | 8.09E-02 | none |
| GLUCONIC ACID | | | | |
| 3.5% NaCl + 500 ppm GA pH 6.40 | 1.26E-01 | none | 5.49E-02 | none |
| 3.5% NaCl + 500 ppm GA pH 8.45 | 9.21E-02 | none | 4.04E-02 | none |
| 3.5% NaCl + 500 ppm GA pH 9.42 | 1.20E-01 | none | 6.07E-02 | none |

The results show that (s,s)EDDS is a good metal cleaner. The results also show that (s,s)EDDS has a low corrosive effect on metals such as aluminum.

Further Metal Cleaning Studies

Molar equivalent amounts of metal or metal oxides were added to 5% w/w ligand solution (50 g). The mixture was stirred in a sealed container for 24 hours. The mixture was then filtered and the filtrate was analyzed for metal ions by ICP (Inductively Coupled Plasma Atomic Absorption Spectrometry).

| Test Conditions | | |
| --- | --- | --- |
| Ligand: | (s,s)EDDS | 50 g of 5% w/w solution |
|  | EDTA | 50 g of 5% w/w solution |
| Solid: | Copper as foil | (0.5441 g) |
|  | Aluminum as foil | (0.2312 g) |
|  | Iron (III) Oxide as powder | (1.3672 g) |
|  | Copper (II) Oxide as powder | (0.6849 g) |
| Temperature: | 25° C., 75° C. | |
| pH: | 7,10 | |

The results of these further tests are reported in the Tables below and in FIGS. 2–5.

|  | pH 7 | pH 10 |
| --- | --- | --- |
| CONCENTRATION ( ppm) OF Cu(II) IONS IN 5% (s,s)EDDS SOLUTIONS EXPOSED TO Cu (II) OXIDE | | |
| 25° C. | 2595 | 2195 |
| 75° C. | 4960 | 2820 |
| CONCENTRATION ( ppm) OF Fe(III) IONS IN 5% (s,s)EDDS SOLUTIONS EXPOSED TO Fe (III) OXIDE | | |
| 25° C. | 4.6 | 0.2 |
| 75° C. | 84 | 6 |
| CONCENTRATION ( ppm) OF Fe(III) IONS REMOVED FROM Fe(III) OXIDE USING 5% LIGAND SOLUTIONS AT 25° C. | | |
| (s,s)EDDS | 4.6 | 0.2 |
| Racemic EDDS | <0.1 | <0.1 |

The results show that the cleaning effect of the cleaning composition according to the present invention is better than cleaning compositions containing EDTA or gluconic acid.

The results also show that (s,s)EDDS is a much better metal cleaner than racemic EDDS. This result is very surprising.

In particular, the results show that EDDS, unlike EDTA, does not substantially destroy aluminum substrates. Instead, EDDS selectively removes non-aluminum metal ions from the surface of the aluminum substrate. These results may be found in FIGS. 2 and 3.

Figure 4:
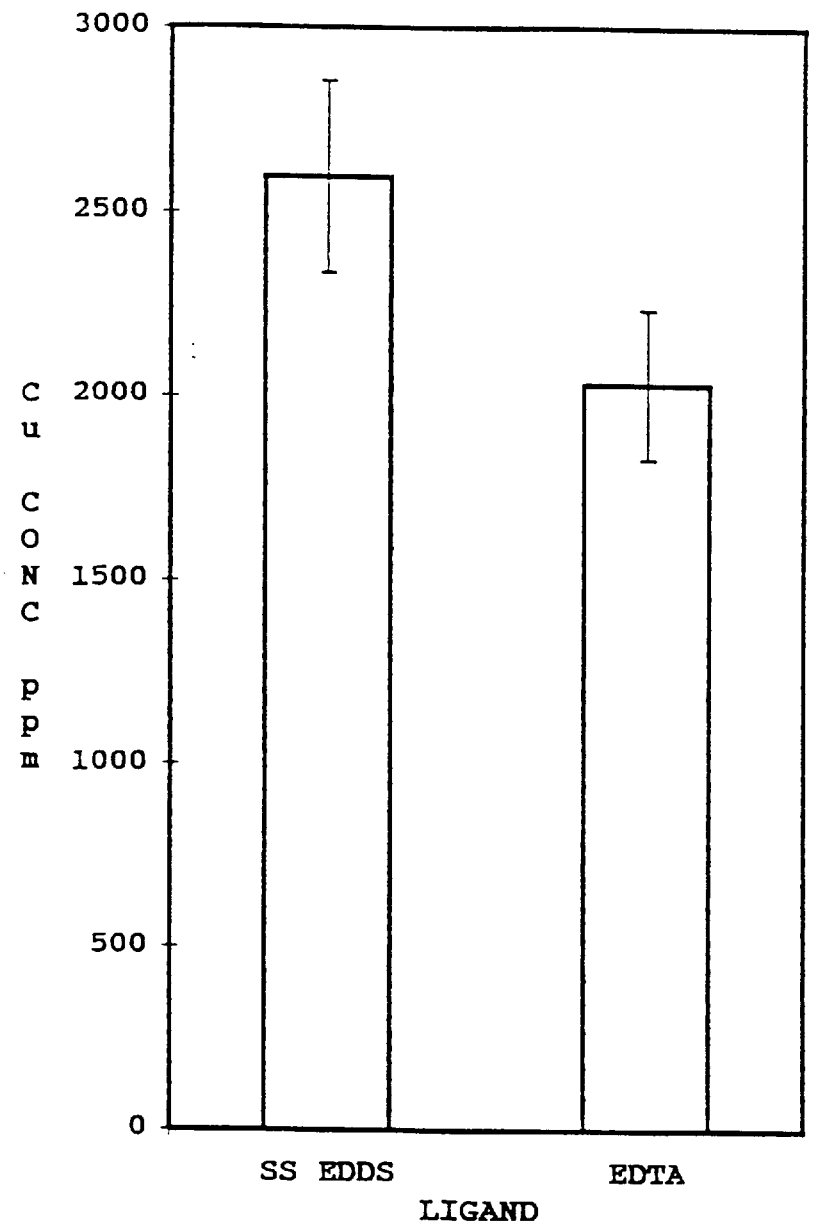
FIG. 4 illustrates the concentration of Cu(II) in 5% ligand solution, after exposure to copper oxide solid for 24 hours at pH 7 and 25° C.
Figure 5:
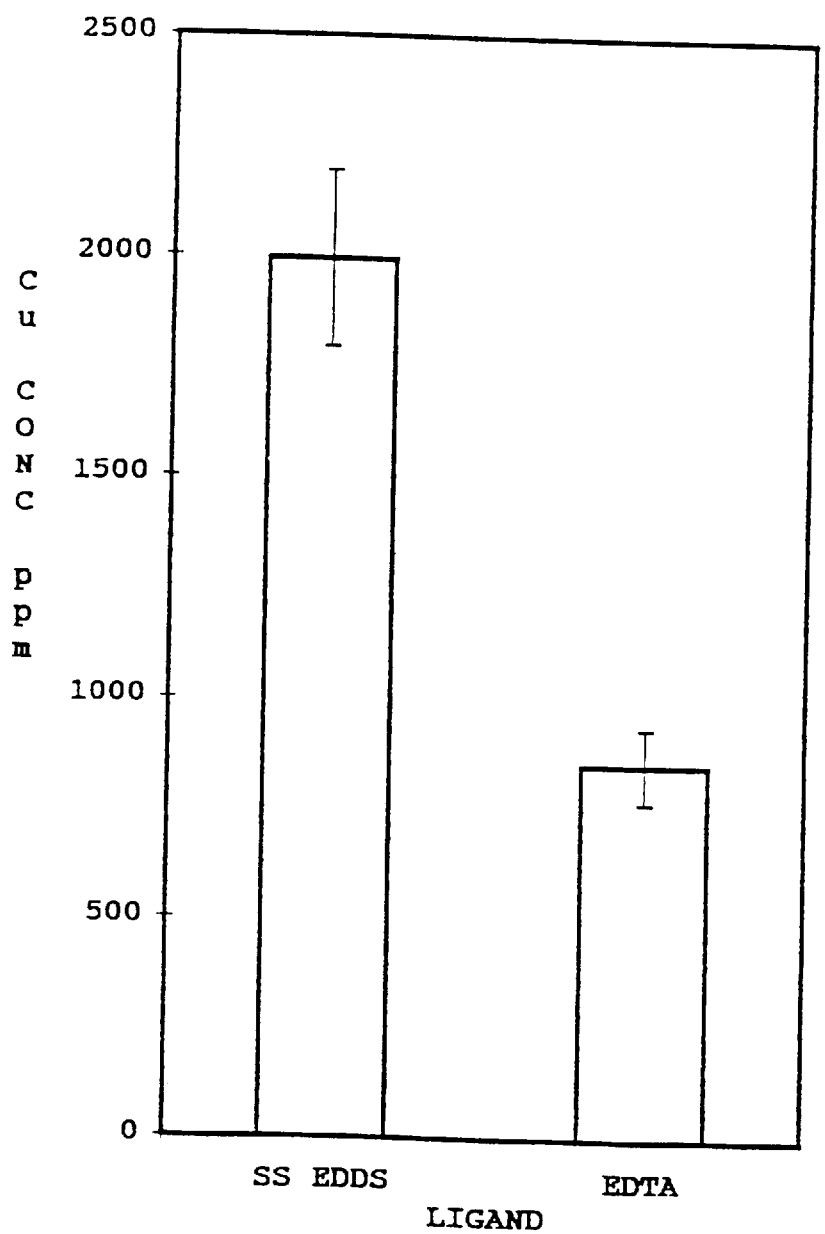
FIG. 5 illustrates the concentration of Cu (II) in 5% ligand solution, after exposure to copper (II) oxide solid for 24 hours at pH 10 and 25° C.

FIGS. 4 and 5 show that EDDS is a better cleaner for removing copper ions than EDTA at low pH—such as pH 7—and even at high pH—such as pH 10.

Figure 6:
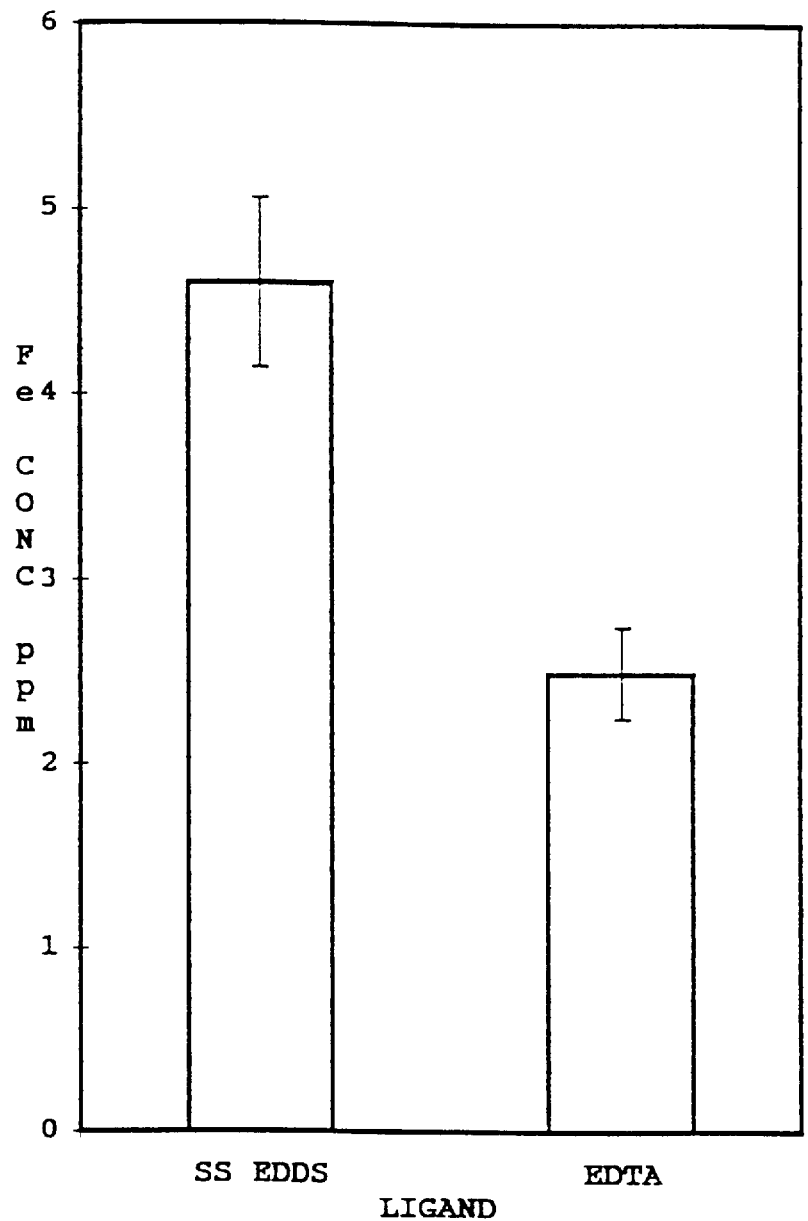
FIG. 6 illustrates the concentration of Fe (III) in 5% ligand solution, after exposure to iron (III) oxide solid for 24 hours at pH 7 and 25° C.

FIG. 6 shows that EDDS is a better cleaner for removing iron ions than EDTA at a low pH—such as pH 7.

Figure 7:
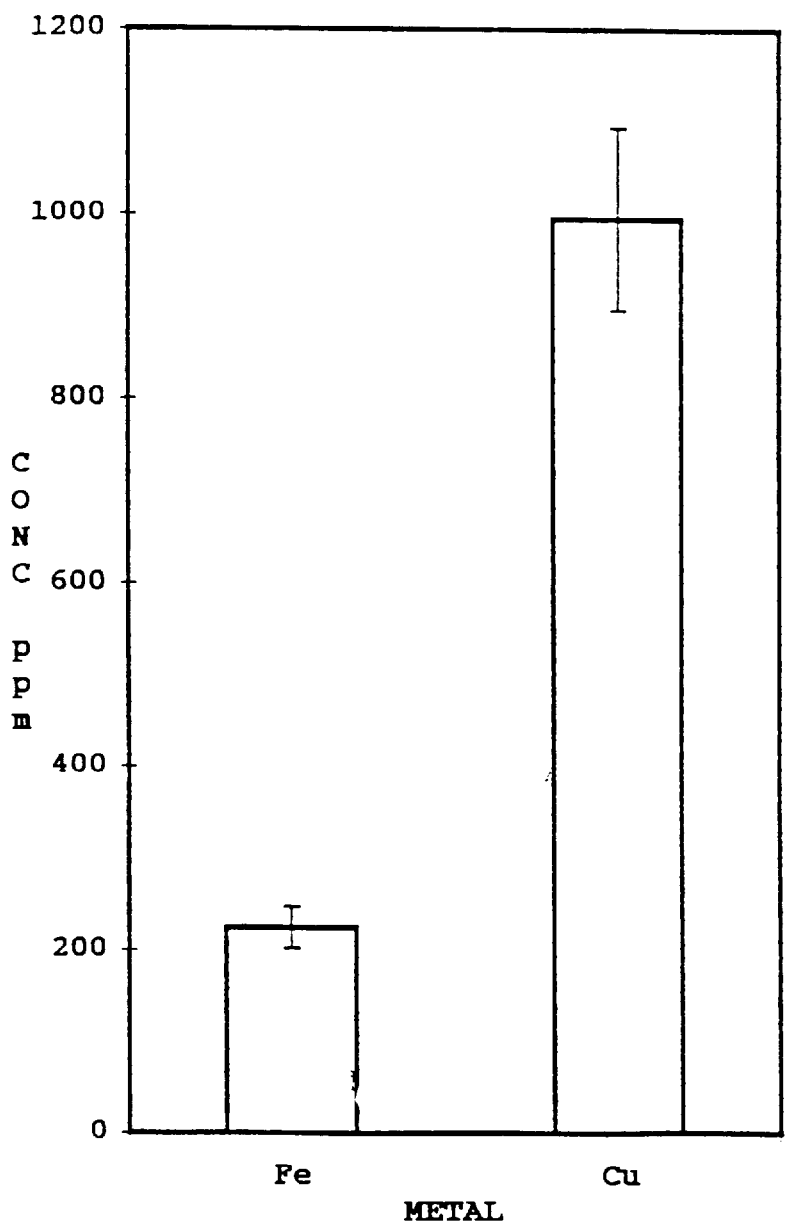
FIG. 7 illustrates the concentration of metal in 5% (s,s) EDDS solution, after exposure to mixed metal oxides for 24 hours at pH 10 and 25° C.
Figure 8:
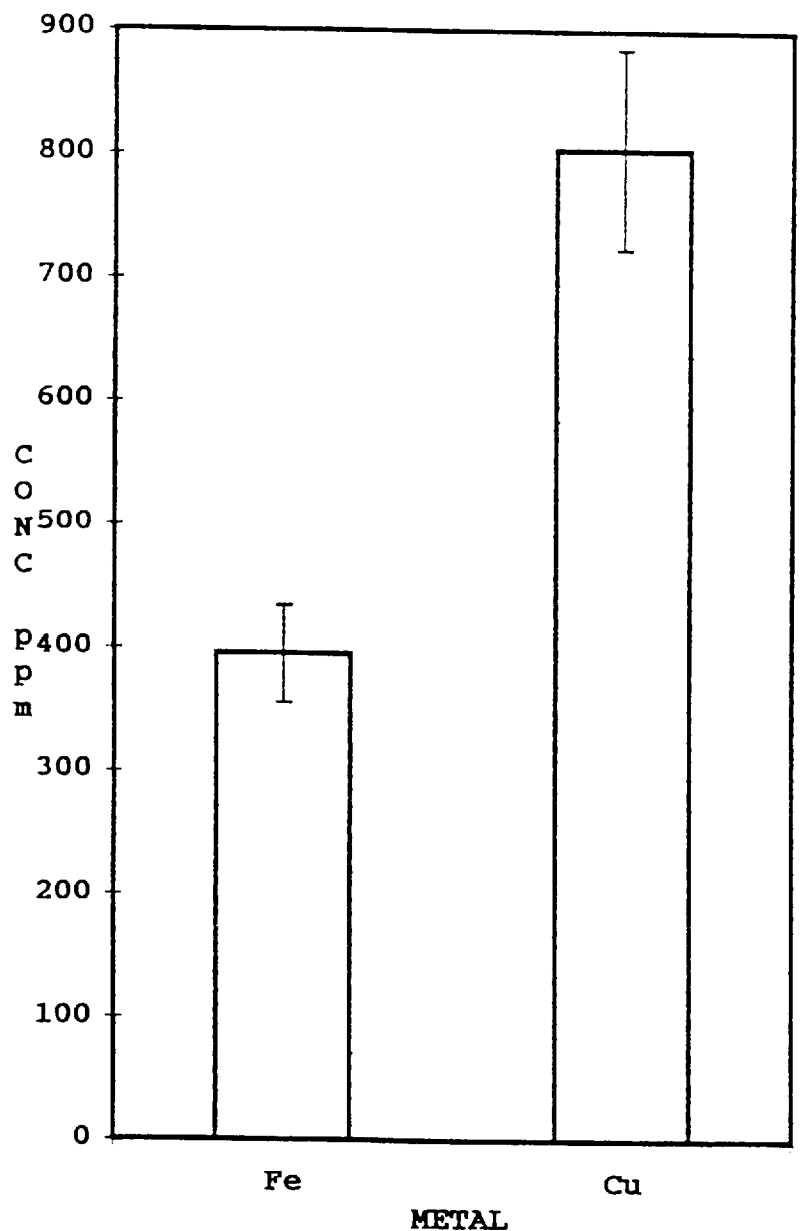
FIG. 8 illustrates the concentration of metal in 5% EDTA solution, after exposure to mixed metal oxides for 24 hours at pH 10 and 25° C.

FIGS. 7 and 8 concern mixed metal systems, such as systems comprising Fe ions and Cu ions.

These results show that EDDS, in particular (s,s)EDDS is a very good cleaner for removing each respective metal ion. Moreover, the results show that there is a surprising synergistic effect when Fe(III) oxide and Cu(II) oxide are cleaned together.

ASTM TEST METHOD

In these studies a series of specialist corrosion tests were performed in accordance with a standard test method for sandwich corrosion testing, namely ASTM test method F1110-90.

SOLUTIONS/MATERIALS TESTED

Five different Calcium Magnesium Acetate (CMA) solutions were provided and were evaluated by Test Method ASTM F1110-90.

The solutions were:

CMA+1% w/w ssEDDS:CMA

CMA+3% w/w ssEDDS:CMA

CMA+1% w/w ssEDTA:CMA

CMA+3% w/w ssEDTA:CMA

CMA solution

The CMA concentration was 5% w/w CMA: water at pH 10.

The 100×50×1.5 mm coupons were of the three metals:

Aluminum AL 1200—99% pure Aluminum.

Aluminum 2024—T3

Aluminum 7075—T6

The Aluminum coupons were bead blast finished and sequentially numbered.

TEST METHOD

The coupons pairs were arranged in sets of the three different metals in numerical order, three sets for the testing of each solution.

|  | Metal Al 1200 | Metal 2024-T3 | Metal 7075-T6 |
|---|---|---|---|
| Solution 1 15% CMA plus 3% (s,s)EDDS | | | |
| Set 1 | 1 & 2 | 1 & 2 | 1 & 2 |
| Set 2 | 3 & 4 | 3 & 4 | 3 & 4 |
| Set 3 | 5 & 6 | 5 & 6 | 5 & 6 |
| Solution 2 15% CMA plus 3% EDTA | | | |
| Set 1 | 7 & 8 | 7 & 8 | 7 & 8 |
| Set 2 | 9 & 10 | 9 & 10 | 9 & 10 |
| Set 3 | 11 & 12 | 11 & 12 | 11 & 12 |
| Solution 3 15% CMA plus 1% (s,s)EDDS | | | |
| Set 1 | 13 & 14 | 13 & 14 | 13 & 14 |
| Set 2 | 15 & 16 | 15 & 16 | 15 & 16 |
| Set 3 | 17 & 18 | 17 & 18 | 17 & 18 |
| Solution 4 15% CMA plus 1% EDTA | | | |
| Set 1 | 19 & 20 | 19 & 20 | 19 & 20 |
| Set 2 | 21 & 22 | 21 & 22 | 21 & 22 |
| Set 3 | 23 & 24 | 23 & 24 | 23 & 24 |
| Solution 5 15% CMA | | | |
| Set 1 | 25 & 26 | 25 & 26 | 25 & 26 |
| Set 2 | 27 & 28 | 27 & 28 | 27 & 28 |
| Set 3 | 29 & 30 | 29 & 30 | 29 & 30 |

The 25×75 mm pieces of fibre glass filter paper were saturated with the test solutions and placed between the pairs of coupons which were then positioned flat on trays to enable the transfer of test specimens between the condensation cabinet and oven during the exposure testing period.

The exposure Schedule consisted of the coupons being exposed alternatively to Relative humidity of 95–100% Ambient both at 37.7° C. (100°F.) for 168 hours as per the following schedule.

| Step | Exposure time (Hrs) | Temp °C. | Rel. Humidity |
|---|---|---|---|
| 1 | 8 | 37.7 | Ambient |
| 2 | 16 | 37.7 | 95–100 |
| 3 | 8 | 37.7 | Ambient |
| 4 | 16 | 37.7 | 95–100 |
| 5 | 8 | 37.7 | Ambient |
| 6 | 16 | 37.7 | 95–100 |
| 7 | 8 | 37.7 | Ambient |
| 8 | 16 | 37.7 | 95–100 |
| 9 | 8 | 37.7 | Ambient |
| 10 | 64 | 37.7 | 95–100 |

RESULTS

SOLUTION 1

15% CMA plus 3% (s,s)EDDS

AL 1200: No corrosion on all three pairs ½ 3/4 5/6

2024-T3: No corrosion on all three pairs ½ 3/4 5/6

7975 T6: No corrosion on all three pairs ½ 3/4 5/6. There is some very slight staining but does not appear to be a loss of metal but rather an infill

SOLUTION 2

15% CMA plus 3%EDTA

AL 1200: No corrosion on all three pairs 7/8 9/10 11/12

2024-T3: No corrosion on all three pairs 7/8 9/10 11/12. Slight staining no loss of metal 7075-T6: Considerable staining on all pairs 7/8 9/10 11/12. Definite corrosion pattern

SOLUTION 3

15% CMA plus 1% (s,s)EDDS

AL 1200: No corrosion on all three pairs 13/14 15/16 17/18

2024-T3: Corrosion pattern some staining oxide very slight incipient corrosion very slight 7075-T6: Staining and discoloration up to 75% of area

SOLUTION 4

15% CMA Plus 1% EDTA

AL 1200: Slight discoloration bottom coupon number 20. No appreciable corrosion.

2024-T3: Discoloration corrosion pattern oxide

7075-T6: Discoloration slight general corrosion

SOLUTION 5

15% CMA

AL 1200: No corrosion on three pair 25/26 27/28 29/30

2024T-3: Slight corrosion pattern less that 5% 25/26 27/28 possible pit in small area coupon 29 (top)

7075-T6: Discoloration, oxidized layer

The relative, corrosion severity rating system results for both discoloration and corrosion are shown in Tables 4 and 5.

TABLE 4

| | Discoloration | | |
|---|---|---|---|
| Solution | AL 1200 | 2024-T3 | 7073-T6 |
| 1 | 0 | 0 | 0–1 |
| 2 | 0 | 1 | 2 |
| 3 | 0 | 1 | 2 |
| 4 | 0 | 2 | 3 |
| 5 | 0 | 3 | 3 |

TABLE 5

| | Corrosion | | |
|---|---|---|---|
| Solution | AL 1200 | 2024-T3 | 7073-T6 |
| 1 | 0 | 0 | 0 |
| 2 | 0 | 0 | 1 |
| 3 | 0 | 1 | 2 |
| 4 | 0 | 2 | 2 |
| 5 | 0 | 1 | 3 |

The above mentioned studies show that EDDS is an effective metal cleaner. The results also indicate that EDDS is a particularly effective if mixed metal ions are present. Another important advantage is that EDDS does not destroy aluminum surfaces. In this regard, EDDS selectively removes deposits of unwanted metal ions such as copper ions and iron ions in the forms of their oxides without removing the aluminum. This is particularly advantageous. This effect of EDDS is in complete contrast to the effects of chelates such as EDTA.

Other modifications of the present invention will be apparent to those skilled in the art.

We claim:

1. A metal cleaning composition comprising as an active agent optically active EDDS.

2. The metal cleaning composition of claim 1 wherein said EDDS is (s,s)EDDS.

3. The metal cleaning composition of claim 2 wherein said (s,s)EDDS is prepared by an amino acid linking reaction.

4. A process of using EDDS as a low-corrosive cleaning agent in a metal cleaning composition, said process comprising the steps of:

applying a metal cleaning composition comprising optically active EDDS to a surface.

5. The process of claim 4 wherein said EDDS is (s,s) EDDS.

6. The process of claim 5 wherein said (s,s)EDDS is prepared by an amino acid linking reaction.

7. A process for cleaning an aluminum surface by removing unwanted metal deposits thereon without substantially destroying the aluminum surface, said process comprising:

exposing said aluminum surface to optically active EDDS.

8. The process of claim 7 wherein said EDDS is (s,s) EDDS.

9. The process of claim 8 wherein said (s,s)EDDS is prepared by an amino acid linking reaction.

10. A de-icer composition comprising optically active EDDS.

11. The de-icer composition of claim 10 wherein said EDDS is (s,s)EDDS.

12. The de-icer composition of claim 11 wherein said (s,s)EDDS is prepared by an amino acid linking reaction.

13. A process for cleaning metal comprising:

providing a metal cleaning composition comprising optically active EDDS; and contacting said metal with said metal cleaning composition.

14. The process of claim 13 wherein said EDDS is (s,s)EDDS.

15. The process of claim 14 wherein said (s,s)EDDS is prepared by an amino acid linking reaction.

16. The process of claim 13 wherein said metal is selected from the group consisting of iron, zinc, aluminium, copper, and combinations thereof.

17. The process of claim 16 wherein said metal is aluminium.

18. The process of claim 16 wherein said metal comprises copper and iron.

* * * * *